US011950263B2

(12) United States Patent
Yao et al.

(10) Patent No.: US 11,950,263 B2
(45) Date of Patent: *Apr. 2, 2024

(54) CONCURRENT CHANNEL STATE INFORMATION (CSI) CAPABILITY REPORTING USING MULTIPLE CODEBOOKS

(71) Applicant: Apple Inc., Cupertino, CA (US)

(72) Inventors: Chunhai Yao, Beijing (CN); Chunxuan Ye, San Diego, CA (US); Dawei Zhang, Saratoga, CA (US); Ghaith N Hattab, Santa Clara, CA (US); Haitong Sun, Irvine, CA (US); Hong He, Cupertino, CA (US); Ismael Gutierrez Gonzalez, San Jose, CA (US); Oghenekome Oteri, San Diego, CA (US); Wei Zeng, San Diego, CA (US); Weidong Yang, San Diego, CA (US); Yeong-Sun Hwang, Germering (DE); Yuchul Kim, Santa Clara, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/084,049

(22) Filed: Dec. 19, 2022

(65) Prior Publication Data

US 2023/0156753 A1 May 18, 2023

Related U.S. Application Data

(63) Continuation of application No. 17/259,777, filed as application No. PCT/CN2020/074926 on Feb. 12, 2020, now Pat. No. 11,570,782.

(51) Int. Cl.
*H04W 72/51* (2023.01)
*H04L 5/00* (2006.01)
(Continued)

(52) U.S. Cl.
CPC ........... *H04W 72/51* (2023.01); *H04L 5/0026* (2013.01); *H04L 5/0048* (2013.01); *H04W 72/541* (2023.01); *H04W 72/542* (2023.01)

(58) Field of Classification Search
CPC ................ H04L 5/0026; H04L 5/0048; H04L 25/03898–03949; H04W 8/22–245; H04W 72/541; H04W 72/542
See application file for complete search history.

(56) References Cited

U.S. PATENT DOCUMENTS

2015/0124638 A1   5/2015   Sun
2020/0169926 A1   5/2020   Hwang
(Continued)

FOREIGN PATENT DOCUMENTS

EP      3562056         10/2019
KR      1020180081114    7/2018
(Continued)

OTHER PUBLICATIONS

First Office Action for JP Patent Application No. 2022-547956; dated Jul. 31, 2023.
(Continued)

*Primary Examiner* — Benjamin H Elliott, IV
*Assistant Examiner* — Prince A Mensah
(74) *Attorney, Agent, or Firm* — Kowert, Hood, Munyon, Rankin & Goetzel, P.C.

(57) ABSTRACT

A user equipment (UE) transmits concurrent channel state information (CSI) processing capability information to a base station. The capability information can take various forms, and is intended to constrain the base station in the types of CSI requests that can be made to the UE. For example, the UE may indicate different CSI processing capabilities for intra-CC and inter-CC cases and/or for different codebook types. The UE may also specify sup-
(Continued)

ported combinations of codebook types for concurrent CSI reporting. The UE may also specify maximum resources or weighting factors for different codebook types. The UE may further restrict the rank information it provides and use a priority rule for "dropping" CSI report data due to payload size restrictions. The base station may direct, or the UE may implement, improved utilization of CSI resources that are shared for multiple concurrent CSI reports. Minimum time requirements for CSI reporting may also be relaxed.

20 Claims, 12 Drawing Sheets

(51) Int. Cl.
 *H04W 72/541* (2023.01)
 *H04W 72/542* (2023.01)

(56) References Cited

U.S. PATENT DOCUMENTS

| | | | |
|---|---|---|---|
| 2020/0351858 A1* | 11/2020 | Tsai | H04W 8/24 |
| 2021/0075486 A1* | 3/2021 | Song | H04W 8/24 |
| 2021/0126687 A1 | 4/2021 | Venugopal | |
| 2021/0127387 A1 | 4/2021 | Huang | |
| 2021/0153129 A1 | 5/2021 | Venugopal | |

FOREIGN PATENT DOCUMENTS

| | | |
|---|---|---|
| KR | 1020180122936 | 11/2018 |
| KR | 1020190028351 | 3/2019 |
| WO | 2018202134 | 11/2018 |
| WO | 2019083260 | 5/2019 |
| WO | 2019137226 | 7/2019 |

OTHER PUBLICATIONS

Qualcomm Inc "Remaining issues on CSI Enhancement for MU-MIMO Support"; 3GPP TSG RAN WG1 Meeting #98bis R1-1911125; Oct. 14, 2019.
International Search Report and Written Opinion for PCT Application No. PCT/CN2020/074926; 9 pages; dated Nov. 17, 2020.
Samsung "Feature lead summary for MU-MIMO CSI"; 3GPP TSG RAN WG1 #99 R1-1912480; Nov. 22, 2019.
Nokia et al. "Rel-16 Type II related UE capabilities and remaining UCI aspects"; 3GPP TSG RAN WG1 Meeting #99 R1-1912718; 7 Pages; Nov. 22, 2019.
NTT Documo "UE Capability for Type II CSI Enhancements"; 3GPP TSG RAN WG1 Meeting #99 R1-1912892; Nov. 22, 2019.
Motorola Mobility et al. "MU-CSI Type II Enhancements"; 3GPP TSG RAN WG1 Meeting RAN #99 R1-1912855; Nov. 22, 2019.
Ericsson "On CSI enhancments for MU-MIMO"; 3GPP TSG RAN WG1 Meeting RAN1 #99 R1-1912662; Nov. 22, 2019.
Notice of Allowance for KR Patent Application 1020217003813; 5 pages; dated Aug. 25, 2022.
Office Action for KR Patent Application No. 1020217003813; 19 pages; dated Feb. 25, 2022.
Extended European Search Report for EP Patent Application No. 20845649.1; dated Sep. 30, 2021.

* cited by examiner

FIG. 15A

| $\mu$ | $Z_1$ [symbols] | |
|---|---|---|
| | $Z_1$ | $Z'_1$ |
| 0 | 10 | 8 |
| 1 | 13 | 11 |
| 2 | 25 | 21 |
| 3 | 43 | 36 |

FIG. 15B

| $\mu$ | $Z_1$ [symbols] | | $Z_2$ [symbols] | | $Z_3$ [symbols] | |
|---|---|---|---|---|---|---|
| | $Z_1$ | $Z'_1$ | $Z_2$ | $Z'_2$ | $Z_3$ | $Z'_3$ |
| 0 | 22 | 18 | 40 | 37 | 22 | $X_1$ |
| 1 | 33 | 30 | 72 | 69 | 33 | $X_2$ |
| 2 | 44 | 42 | 141 | 140 | $Min(44, X_3 + KB_1)$ | $X_3$ |
| 3 | 97 | 85 | 152 | 140 | $Min(97, X_4 + KB_2)$ | $X_4$ |

CONCURRENT CHANNEL STATE INFORMATION (CSI) CAPABILITY REPORTING USING MULTIPLE CODEBOOKS

PRIORITY CLAIM INFORMATION

This application is a continuation of U.S. patent application Ser. No. 17/259,777, entitled "Concurrent Channel State Information (CSI) Capability Reporting using Multiple Codebooks," filed Jan. 12, 2021, which is a national phase entry of PCT application number PCT/CN2020/074926, entitled "Concurrent Channel State Information (CSI) Capability Reporting using Multiple Codebooks," filed Feb. 12, 2020, which is hereby incorporated by reference in its entirety as though fully and completely set forth herein. The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD OF THE INVENTION

The present application relates to wireless devices, and more particularly to a system and method for reporting channel state information (CSI) capability when performing concurrent CSI processing using multiple codebooks.

DESCRIPTION OF THE RELATED ART

Wireless communication systems have rapidly grown in usage. In recent years, wireless devices such as smart phones and tablet computers have become increasingly sophisticated. Mobile devices (i.e., user equipment devices or UEs) support telephone calls as well as provide access to the Internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), NR, HSPA, 3GPP2 CDMA2000 (e.g., 1×RTT, 1×EV-DO, HRPD, eHRPD), IEEE 802.11 (WLAN or Wi-Fi), BLUETOOTH™, etc.

In order to provide improved communication between a base station (BS) and wireless user equipment (UE) devices, the UE may calculate various metrics that indicate channel quality for feedback to the base station. The UE may generate these various metrics for a channel based on a received downlink (DL) reference signal from the base station. Without loss of generality, these metrics may be referred to collectively as channel state information (CSI). Channel State Information may include estimation of the spectral efficiency, the number of data layers, the pre-coding matrices in the scenarios of multiple input and multiple output (MIMO) antenna systems, etc. CSI for a channel can also be computed based on other performance metrics, such as signal-to-noise ratio (SNR), signal-to-interference plus noise ratio (SINR), signal-to-noise plus distortion ratio (SNDR), and so forth of the channel.

The base station can use this channel state information to adjust its communication with the UE to provide improved communication with the UE. For example, this channel state information may be used by the BS to determine code rates and a modulation scheme to be assigned to each UE. The code rates and modulation scheme may be selected not only to maximize the throughput to a particular UE, but also to improve the overall throughput of the base station communication area (e.g., the cell) through scheduling. The use of channel quality information thus allows the base station to more fully exploit the status of the wireless channel to improve communication throughput with various UEs.

Given that channel state information is used by the base station to improve downlink communication with UEs, the generation of appropriate CSI is very important. Therefore, improvements in the field are desirable.

SUMMARY OF THE INVENTION

Embodiments are presented herein of apparatuses, systems, and methods for a wireless device to perform improved reporting of concurrent channel state information (CSI) capabilities to a base station.

According to the techniques described herein, a wireless device, such as user equipment (UE), transmits concurrent channel state information (CSI) processing capability information to a base station. The concurrent CSI processing capability information can take various forms, and is intended to constrain the base station in the types of CSI requests that can be made to the UE. For example, the UE may indicate different CSI processing capabilities for intra-CC and inter-CC cases and/or for different codebook types. The UE may also specify supported combinations of codebook types for concurrent CSI reporting, and/or may specify different concurrent CSI reporting capabilities for different component carrier configurations. The UE may also specify maximum resources or weighting factors for different codebook types.

When the UE generates CSI reports to the base station, the UE may restrict the rank information it provides based on the type of CSI processing performed. The UE may also use a priority rule for "dropping" CSI report data due to payload size restrictions, based on the type of CSI processing. The base station may also direct, or the UE may implement, improved utilization of CSI resources that are shared for multiple concurrent CSI reports. Minimum time requirements for CSI reporting may also be relaxed.

Note that the techniques described herein may be implemented in and/or used with a number of different types of devices, including but not limited to base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present invention can be obtained when the following detailed description of the embodiments is considered in conjunction with the following drawings.

FIGS. 15A and 15B are tables containing possible CSI computation delay requirements, according to some embodiments.

Figure 1:
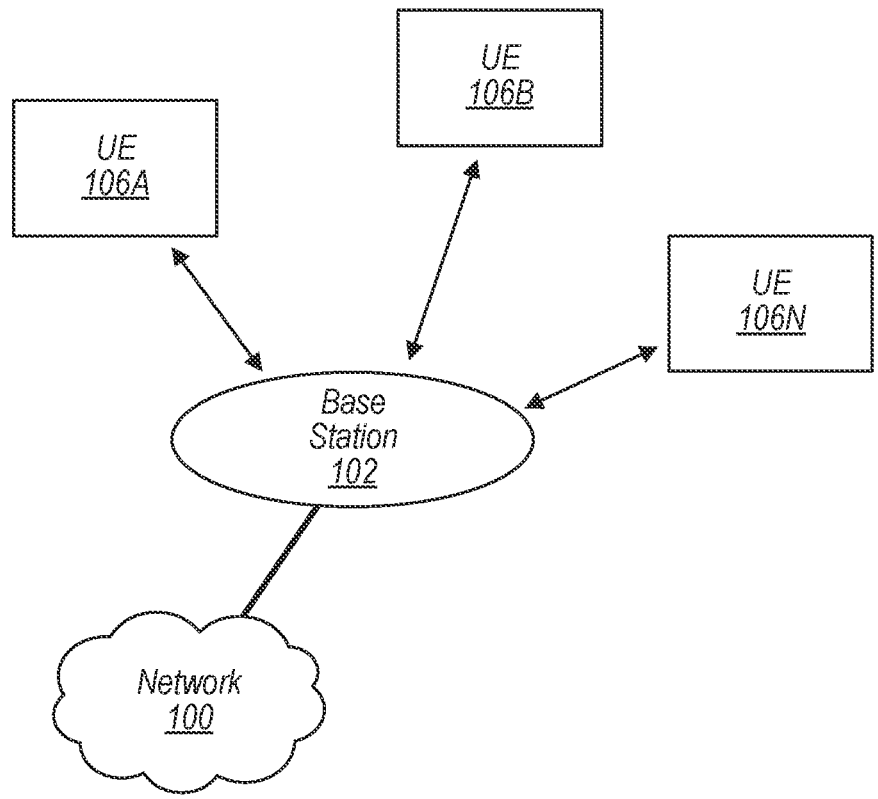
FIG. 1 illustrates an exemplary (and simplified) wireless communication system.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Acronyms

Various acronyms are used throughout the present disclosure. Definitions of the most prominently used acronyms that may appear throughout the present disclosure are provided below:

UE: User Equipment
RF: Radio Frequency
BS: Base Station
DL: Downlink
UL: Uplink
GSM: Global System for Mobile Communication
UMTS: Universal Mobile Telecommunication System
LTE: Long Term Evolution
NR: New Radio
TX: Transmission/Transmit
RX: Reception/Receive
RAT: Radio Access Technology
PUSCH: Physical Uplink Shared Channel
PDCCH: Physical Downlink Control Channel
CC: Component Carrier
CA/DC: Carrier Aggregation/Dual Connectivity
CSI: Channel State Information
CRS: Cell-Specific Reference Signal(s)
CSI-RS: Channel State Information Reference Signal
CMR: Channel Measurement Resource
IMR: Interference Measurement Resource
NZP: Non Zero-Power
ZP: Zero-Power
MCS: Modulation and Coding Scheme
RE: Resource Element
CQI: Channel Quality Indicator
PMI: Precoding Matrix Indicator
RI: Rank Indicator

Terms

The following is a glossary of terms that may appear in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems or devices that are mobile or portable and that perform wireless communications. Examples of UE devices include mobile telephones or smart phones (e.g., iPhone™, Android™-based phones), tablet computers (e.g., iPad™, Samsung Galaxy™), portable gaming devices (e.g., Nintendo DS™, PlayStation Portable™, Gameboy Advance™, iPhone™), wearable devices (e.g., smart watch, smart glasses), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station (BS)—The term "Base Station" has the full breadth of its ordinary meaning, and at least includes a wireless communication station installed at a fixed location and used to communicate as part of a wireless telephone system or radio system.

Processing Element (or Processor)—refers to various elements or combinations of elements that are capable of performing a function in a device, e.g., in a user equipment device or in a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
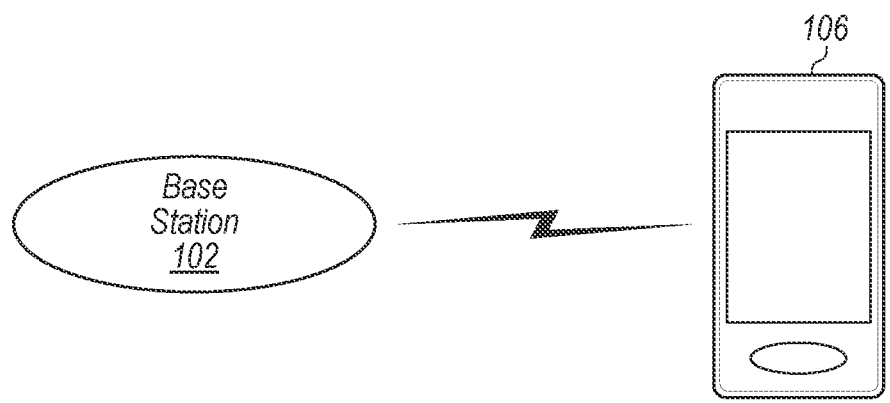
FIG. 2 illustrates a base station in communication with user equipment.

FIGS. 1 and 2—Exemplary Communication System

FIG. 1 illustrates an example (and simplified) wireless communication system in which aspects of this disclosure may be implemented, according to some embodiments. It is noted that the system of FIG. 1 is merely one example of a possible system, and embodiments may be implemented in any of various systems, as desired.

As shown, the example wireless communication system includes a base station 102 which communicates over a transmission medium with one or more (e.g., an arbitrary number of) user devices 106A, 106B, etc. through 106N. Each of the user devices may be referred to herein as a "user equipment" (UE) or UE device. Thus, the user devices 106 are referred to as UEs or UE devices. The UE devices are examples of wireless devices.

The base station 102 may be a base transceiver station (BTS) or cell site, and may include hardware and/or software that enables wireless communication with the UEs 106A through 106N. If the base station 102 is implemented in the context of LTE, it may alternately be referred to as an 'eNodeB' or 'eNB'. If the base station 102 is implemented in the context of 5G NR, it may alternately be referred to as a 'gNodeB' or 'gNB'. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication among the user devices and/or between the user devices and the network 100. The communication area (or coverage area) of the base station may be referred to as a "cell." As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 5G NR, 3GPP2 CDMA2000 (e.g., 1×RTT, 1×EV-DO, HRPD, eHRPD), Wi-Fi, etc.

Base station 102 and other similar base stations operating according to the same or a different cellular communication standard may thus be provided as one or more networks of cells, which may provide continuous or nearly continuous overlapping service to UE 106 and similar devices over a geographic area via one or more cellular communication standards.

Note that a UE 106 may be capable of communicating using multiple wireless communication standards. For example, a UE 106 might be configured to communicate using either or both of a 3GPP cellular communication standard or a 3GPP2 cellular communication standard. In some embodiments, the UE 106 may be configured to re-establish a packet data network connection such as according to the various methods described herein. The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H), etc. Other combinations of wireless communication standards (including more than two wireless communication standards) are also possible.

FIG. 2 illustrates an example user equipment 106 (e.g., one of the devices 106A through 106N) in communication with the base station 102, according to some embodiments. The UE 106 may be a device with wireless network connectivity such as a mobile phone, a hand-held device, a wearable device, a computer or a tablet, or virtually any type of wireless device. The UE 106 may include a processor (processing element) that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, 5G NR, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware.

In some embodiments, the UE 106 may include separate transmit and/or receive chains (e.g., including separate antennas and other radio components) for each wireless communication protocol with which it is configured to communicate. As a further possibility, the UE 106 may include one or more radios that are shared between multiple wireless communication protocols, and one or more radios that are used exclusively by a single wireless communication protocol. For example, the UE 106 may include a shared radio for communicating using either of LTE or CDMA2000 1×RTT (or LTE or NR, or LTE or GSM), and separate radios for communicating using each of Wi-Fi and BLUETOOTH™. Other configurations are also possible.

Figure 3:
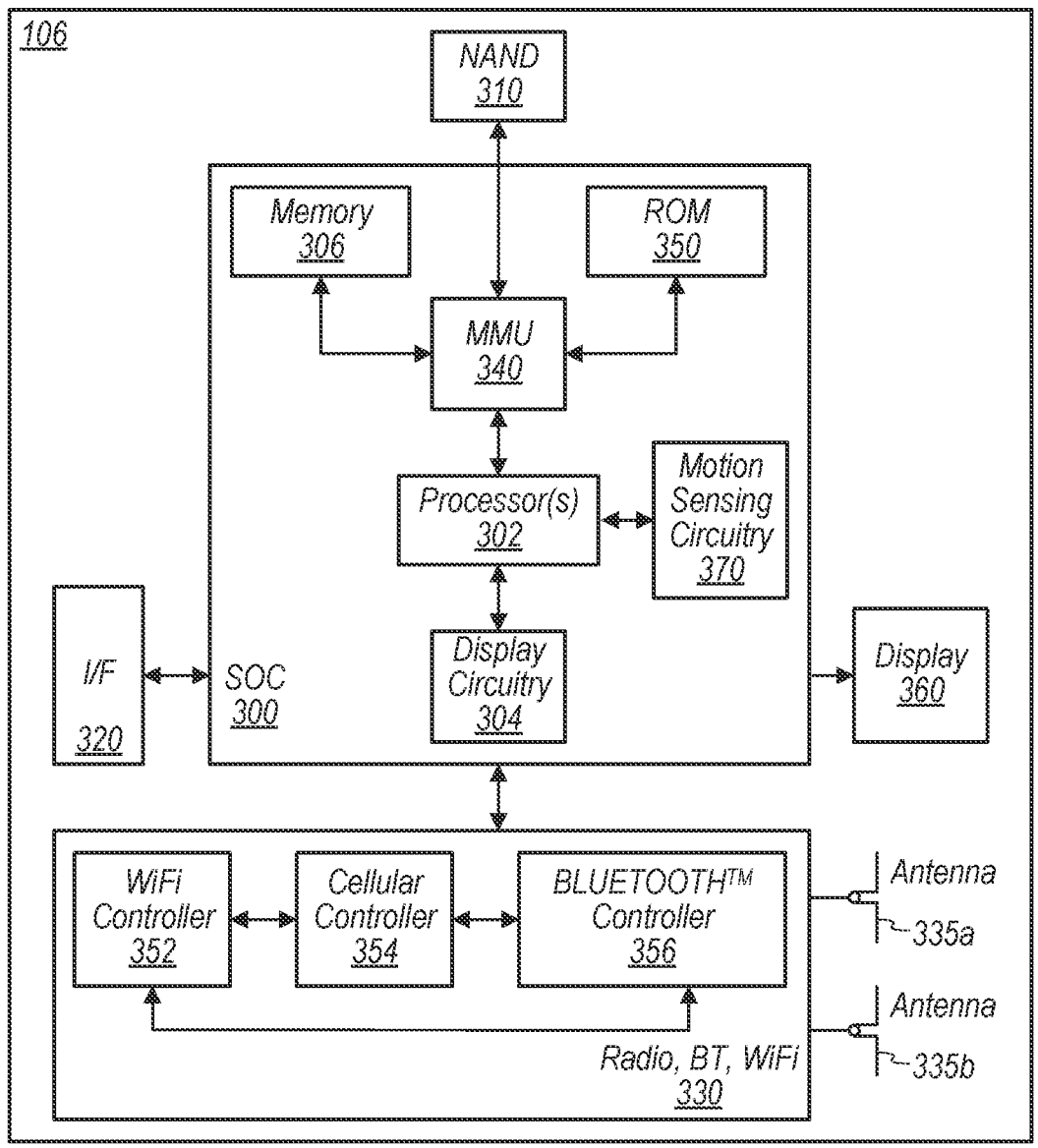
FIG. 3 illustrates an example block diagram of a UE, according to one embodiment.

FIG. 3—Block Diagram of an Exemplary UE Device

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The SOC 300 may also include motion sensing circuitry 370 which may detect motion of the UE 106, for example using a gyroscope, accelerometer, and/or any of various other motion sensing components. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 360, and wireless communication circuitry 330 (e.g., for LTE, LTE-A, NR, CDMA2000, BLUETOOTH™, Wi-Fi, GPS, etc.). The UE device 106 may include at least one antenna (e.g. 335a), and possibly multiple antennas (e.g. illustrated by antennas 335a and 335b), for performing wireless communication with base stations and/or other devices. Antennas 335a and 335b are shown by way of example, and UE device 106 may include fewer or more antennas. Overall, the one or more antennas are collectively referred to as antenna 335. For example, the UE device 106 may use antenna 335 to perform the wireless communication with the aid of radio circuitry 330. As noted above, the UE may be configured to communicate wirelessly using multiple wireless communication standards in some embodiments.

The UE 106 may include hardware and software components for implementing methods for the UE 106 to perform concurrent generation of multiple codebooks for CSI reporting such as described further subsequently herein. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to perform concurrent generation of multiple codebooks for CSI reporting according to various embodiments disclosed herein. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 352, a cellular controller (e.g. LTE and/or LTE-A controller) 354, and BLUETOOTH™ controller 356, and in at least some embodiments, one or more or all of these controllers may be implemented as respective integrated circuits (ICs or chips, for short) in communication with each other and with SOC 300 (and more specifically with processor(s) 302). For example, Wi-Fi controller 352 may communicate with cellular controller 354 over a cell-ISM link or WCI interface, and/or BLUETOOTH™ controller 356 may communicate with cellular controller 354 over a cell-ISM link, etc. While three separate controllers are illustrated within radio 330, other embodiments have fewer or more similar controllers for various different RATs that may be implemented in UE device 106.

Further, embodiments in which controllers may implement functionality associated with multiple radio access technologies are also envisioned. For example, according to some embodiments, the cellular controller 354 may, in addition to hardware and/or software components for performing cellular communication, include hardware and/or software components for performing one or more activities associated with Wi-Fi, such as Wi-Fi preamble detection, and/or generation and transmission of Wi-Fi physical layer preamble signals.

Figure 4:
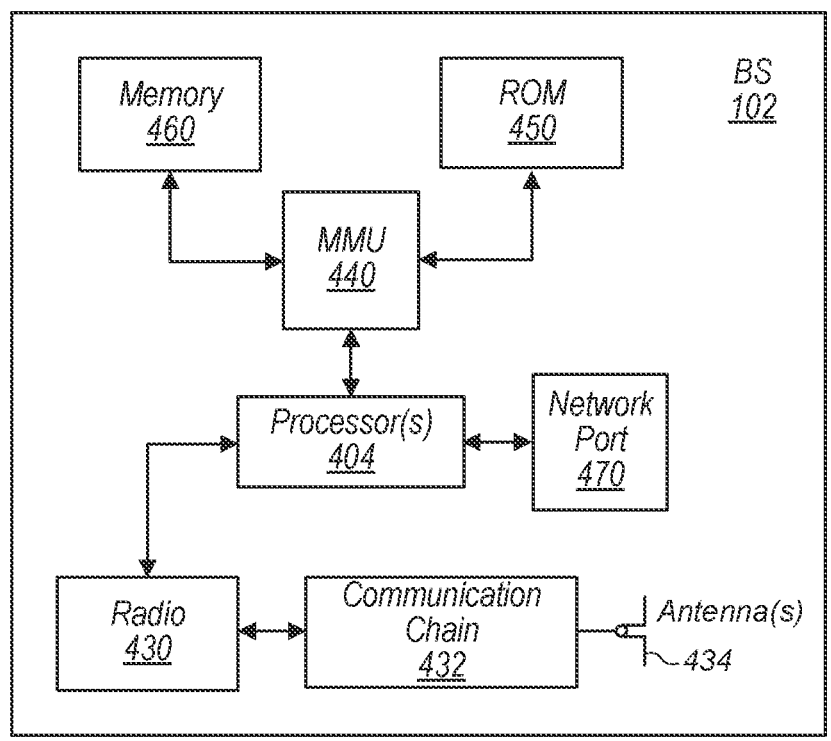
FIG. 4 illustrates an example block diagram of a base station, according to one embodiment.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The antenna(s) 434 may be configured to operate as a wireless transceiver and may be further configured to communicate with UE devices 106 via radio 430. The antenna(s) 434 communicates with the radio 430 via communication chain 432. Communication chain 432 may be a receive chain, a transmit chain or both. The radio 430 may be designed to communicate via various wireless telecommunication standards, including, but not limited to, NR, LTE, LTE-A WCDMA, CDMA2000, etc. The processor 404 of the base station 102 may be configured to implement and/or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard.

Channel State Information

A wireless device, such as a user equipment, may be configured to measure the quality of the downlink channel and report information related to this quality measurement to the base station. For example, the UE may periodically send channel state information (CSI) to a BS. The base station can then receive and use this channel state information to determine an adjustment of various parameters during communication with the wireless device. In particular, the BS may use the received channel state information to adjust the coding of its downlink transmissions to improve downlink channel quality.

in most cellular systems, the base station transmits a pilot signal (or a reference signal), referred to as the channel state information—reference signal (CSI-RS), where this reference signal is used for estimating a channel between the base station and a UE. The UE receives this reference signal and based on this reference signal calculates channel state information (CSI). The UE then reports this channel state information back to the base station. The base station may then generate downlink data based on the received. CSI and transmit this downlink data to the UE. Stated another way, the base station may adjust the manner in which downlink data is coded and generated based on the received channel state information from the UE.

In the NR standard, the channel state information fed back from the UE may typically include two or more of: channel quality indicator (CQI), a precoding matrix index (PM), a rank indicator (RI), a CSI-RS Resource Indicator (CRI), a SSBRI(SS/PBCH Resource Block Indicator), and a Layer Indicator (LI), among other possible information.

The channel quality indicator may be provided to the base station for link adaptation, e.g., for providing guidance as to which modulation & coding scheme (MCS) the base station should use when it transmits data. When the downlink channel communication quality between the base station and the UE is determined to be high, the UE may feed back a high CQI value. This may cause the base station to transmit data using a relatively high modulation order and a low channel coding rate. Alternatively, when the downlink channel communication quality between the base station and the UE is determined to be low, the UE, may feed back a low CQI value. This may cause the base station may transmit data using a relatively low modulation order and a high channel coding rate.

PMI feedback is preferred precoding matrix information provided to a base station in order to indicate which MIMO precoding scheme the base station should use. In other words, the UE measures the quality of a downlink MIMO channel between the base station and the UE, based on a received pilot signal received on the channel, and recommends, through PMI feedback, which MEMO precoding is desired to be applied by the base station. In some cellular systems, the PMI configuration is expressed in matrix form, which provides for linear MIMO precoding. The base station and the UE may share a codebook composed of a plurality of precoding matrixes, and each MIMO precoding matrix in the codebook has a unique index. Accordingly, as part of the channel state information fed back by the UE, the PMI may comprise an index (one or more indices) corresponding to the most preferred MIMO precoding matrix in the codebook. This enables the UE to minimize the amount of feedback information. Thus the PMI may indicate which precoding matrix from a codebook should be used for transmissions to the UE.

The rank indicator information (RI feedback) indicates a number of the UE's preferred transmission layers when the base station and the UE have multiple antennas, which thereby enables multi-layer transmission through spatial multiplexing. The RI and the PMI collectively allow the base station to know which precoding needs to be applied to which layer depending on the number of transmission layers.

In some cellular systems, a PMI codebook is defined depending on the number of transmission layers. In other words, for R-laver transmission, N number of Nt×R matrixes are defined (herein, R represents the number of layers, Nt represents the number of transmitter antenna ports, and N represents the size of the codebook). Here the number of transmission layers (R) conforms to a rank value of the precoding matrix (Nt×R matrix), and hence R is referred to as the "rank indicator (RI)".

Thus, the channel state information may include an allocated rank (e.g., a rank indicator or RI). For example, a MIMO-capable UE communicating with a BS may include four receiver chains, e.g., may include four antennas. The BS may also include four or more antennas to enable MIMO communication (e.g., 4×4 MIMO). Thus, the UE may be capable of receiving up to four (or more) signals (e.g., layers) from the BS concurrently. Layer to antenna mapping may be applied, e.g., each layer may be mapped to any number of antenna ports (e.g., antennas). Each antenna port may send and/or receive information associated with one or more layers. The rank may comprise multiple bits and may indicate the number of signals that the BS may send to the UE in an upcoming time period (e.g., during an upcoming transmission time interval or TTI). For example, an indication of rank 4 may indicate that the BS will send 4 signals to the UE. In the example of 4×4 MIMO, the RI may be two bits in length (e.g., since two bits are sufficient to distinguish 4 different rank values).

Carrier Aggregation

Carrier aggregation is a scheme in which multiple component carriers (or cells) may be used for wireless communication between a base station and a UE. Carrier aggregation may be used in LTE-Advanced and NR in order to increase the data transfer bandwidth, and thereby increase the bitrate, between a base station and a UE. In carrier aggregation, a UE may be configured with multiple component carriers, where each component carrier is referred to as a cell, e.g., either a primary cell or a secondary cell.

When the network configures a UE for channel state information (CSI) reporting, the network will inform the UE as to which component carrier is the subject of the CSI report request, i.e., for which component carrier to perform the channel and interference measurements. The network can configure multiple CSI requests at the same time, i.e., concurrently.

The term "intra-CC" refers to a situation where multiple CSI reports are requested for the same component carrier. For example, these multiple CSI requests may be a wideband (Type I) report and a narrowband (Type II) report. The term "inter-CC" refers to a situation where multiple CSI reports are requested for different component carriers. These two (or more) component carriers may be "intra-band" (in the same frequency band) or "inter-band" (in different frequency bands).

Figure 5A:
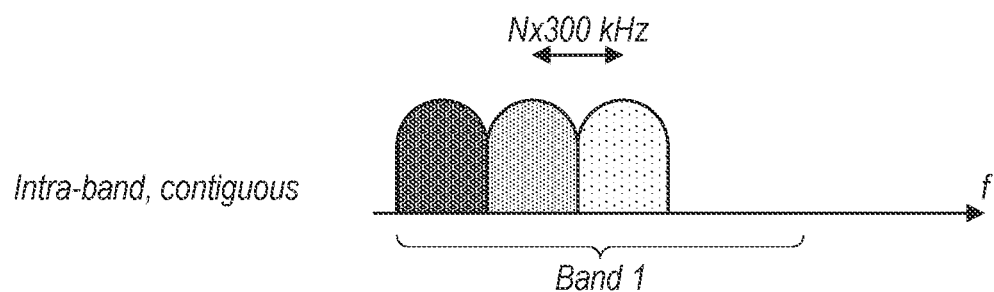
FIGS. 5A-5C illustrates various carrier aggregation configurations according to the prior art.
Figure 5B:
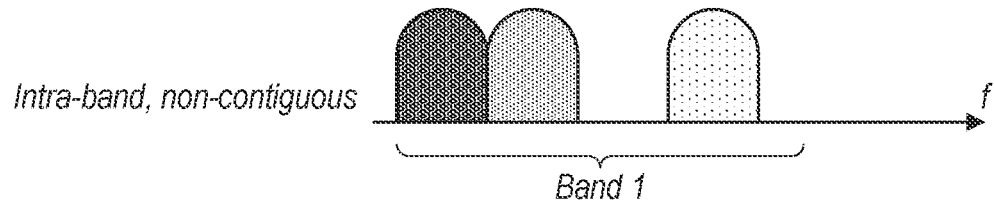
Figure 5C:
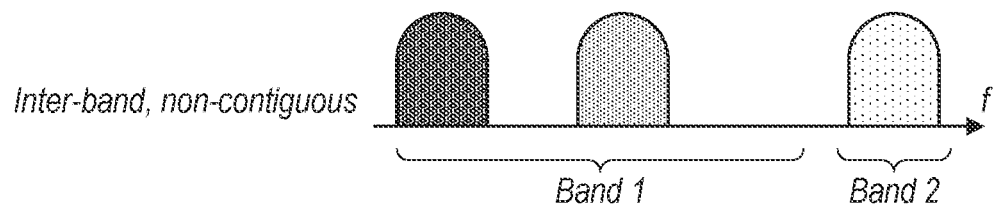

The following is background on intra-band and inter-band component carriers. One way to implement carrier aggregation is to use contiguous component carriers within the same operating frequency band, referred to as intra-band contiguous (FIG. 5A). It may not always be possible to arrange component carriers in an intra-band contiguous fashion, e.g., due to operator frequency allocation scenarios. A second way to implement carrier aggregation is to use non-contiguous intra-band component carriers (FIG. 5B), where the component carriers are in the same operating frequency band but have one or more gaps between them. A third way to implement carrier aggregation is to use non-contiguous inter-band component carriers (FIG. 5C), where the component carriers belong to different operating frequency bands.

In current proposed standards (Release 16 MIMO CSI enhancement), there are six different codebook types for channel state information reporting (feedback). These six different codebook types are as follows:

Rel-15 Type I Single Panel
Rel-15 Type I Multi Panel
Rel-15 Type II
Rel-15 Type II Port Selection
Rel-16 Type II
Rel-16 Type II Port Selection As shown, there are four different codebook types in Release 15, and two additional codebook types added in Release 16. In Release 15, Type I refers to wideband or a lower resolution CSI, where a measurement of the channel is made across a large portion (e.g., all) of the cell transmission spectrum. Type I can be either for Single Panel (single panel or antenna array) or Multi Panel (multiple panel or multiple antenna arrays). In Release 15, Type II refers to subband or higher resolution CSI feedback, where the measurement of the channel is for a specific smaller portion of the spectrum. Release 16 enhances the Type II CSI feedback, mostly by implementing compressed overhead, and allowing even higher resolution CSI feedback.

In some scenarios, a UE may be requested to perform multiple instances of CSI reporting, e.g., generation and transmission of channel state information, at the same time. For example, where the cellular system implements carrier aggregation, the UE may be requested to perform different types of CSI reporting for different component carriers (or the same component carrier) at the same time. As another example, the UE may be requested by the base station to perform an aperiodic CSI report for a CC at the same time a periodic or semi-persistent CSI report is scheduled for the same or another CC.

UE implementation of concurrent CSI reporting with different codebook types raises a number of issues. The current proposed Release 16 standard is unclear regarding concurrent CSI reporting, and hence a base station can request virtually any kind of CSI reporting concurrently. In other words, the base station can configure a UE to concurrently perform multiple different types of CSI reporting. This may place a heavy burden on the UE. For example, the base station can request the UE to perform measurements for Type I CSI reporting and at the same time request the UE to perform measurements for Type II CSI reporting. These multiple instances of CSI processing of different codebook types may be required to share baseband processing power of the UE. As a result, the open-ended requirement of concurrent CSI reporting may complicate the design of UE modems, and may place a burden on UE designers in terms of how to support concurrent CSI Type I and Type II reporting.

The term "CSI-RS processing" may refer to a UE processing a received CSI reference signal (RS) on a downlink channel, e.g. performing channel and interference measurements on the received CSI reference signal, to determine quality of the downlink channel. In terms of CSI-RS processing, the UE currently reports CSI processing capability independently for each codebook type. When the UE is reporting the capability of each CSI codebook type, the UE may assume the worst-case scenario in case two or more (or all) of the codebook types are simultaneously configured. In other words, since the current proposed standard allows for concurrent CSI processing of different codebook types, and the UE reports capability information for each codebook type independently, the UE may undesirably assume, and hence report, the worst case scenario capability for each, to enable proper operation when all of the codebook types are simultaneously configured. For example, the CSI reporting capability information may include the maximum number of ports for each CSI resource, the maximum number of CSI resources, and the maximum number of total ports. In the case where the network does not actually configure all of the codebook types simultaneously, then this worst-case capability reporting will under-utilize the UE's capabilities. Therefore, improvements in the field are desirable.

In particular, described herein are various embodiments wherein the UE provides improved concurrent CSI processing capability reporting that, at least in some instances, operates to constrain or limit the cellular network (base station) in the types of concurrent CSI reporting that it can request of the UE. This may operate to reduce burdens on UE modem design and may also improve the operation of the UE.

The embodiments described herein may be placed into five general categories, as follows:
1) UE concurrent CSI processing capability reporting
2) UE CSI-RS processing capability reporting enhancement
3) Concurrent CSI sharing the same CMR/IMR CSI-RS
4) Concurrent CSI reporting processing time relaxation
5) Concurrent CSI rank restriction 1. UE Concurrent CSI Processing Capability Reporting Currently, general UE channel state information reference signal (CSI-RS) processing capability is defined in TS 38.214, which states in part: "In any slot, the UE is not expected to have more active CSI-RS ports or active CSI-RS resources than reported as capability . . . ."

In some embodiments, the UE operation described herein may operate to provide improved reporting of concurrent CSI processing capabilities, thus enabling the UE to provide greater input on the concurrent CSI reporting that it is requested to perform. Various embodiments of improved reporting of concurrent CSI processing capability is described below with reference to FIG. 6.

Figure 6:
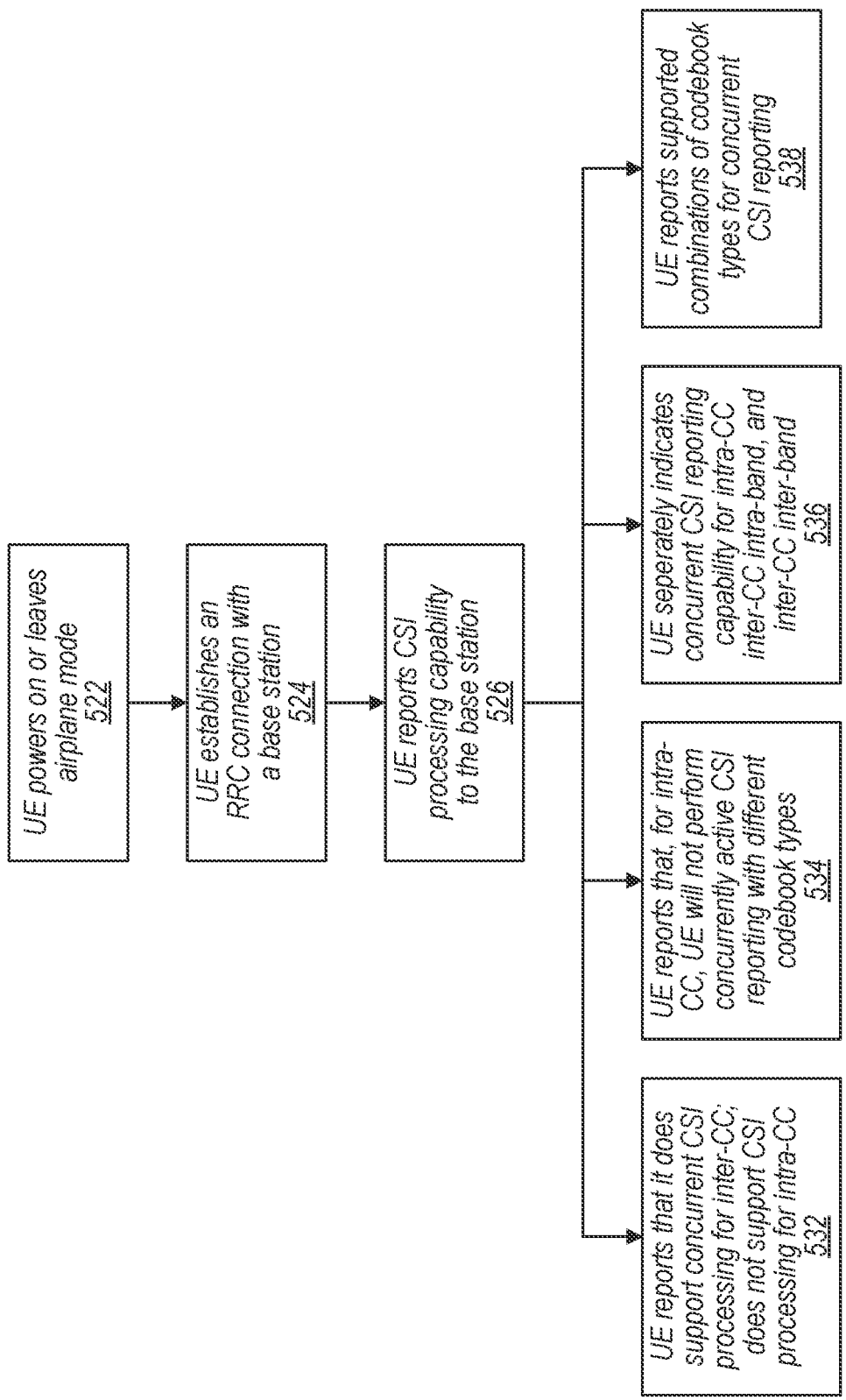
FIG. 6 is a flowchart diagram illustrating various embodiments of a UE reporting concurrent CSI processing capability to the base station.

FIG. 6 is a flowchart diagram illustrating an improved method for reporting concurrent CSI processing capability.

At 522, the UE powers on or leaves airplane mode. In other words, at 522 the UE enters a state where it begins actively searching for a cellular connection.

At 524, the UE establishes an RRC (Radio Resource Control) connection with a base station. Thus at 524 the UE connects to a cell of a base station. In some embodiments, the UE and network implement carrier aggregation, wherein the cellular network may transmit data to the UE using one or more component carriers. As described above with respect to FIG. 5, the one or more component carriers may be implemented as intra-CC or inter-CC, and further may be intra-band contiguous, intra-band non-contiguous, and inter-band non-contiguous.

At 526, the UE reports its channel state information (CSI) processing capability to the base station. As one example, the UE may report one or more CSI configurations that it supports, and possibly also one or more Z values, where Z is the minimum required number of symbols for CSI computation for a given CSI configuration. As part of the report of CSI processing capability, the UE may perform one or more of 532-538 as described below.

In addition to (or instead of) reporting any standard CSI processing capability information, in some embodiments the UE may also report capability information on concurrent CSI processing that the UE is able to perform, as indicated in one or more of 532-538 of FIG. 6. Thus the UE may report capability information on concurrent CSI processing by performing one or more of 532-538. This allows the UE to provide greater control over the concurrent CSI processing that it may be requested to perform. This may help to reduce the UE's processing burden when performing CSI reporting.

As shown at 532, in some embodiments, for capability reporting of concurrent CSI processing of multiple codebook types, the UE may report a specific type of concurrent CSI reporting treatment for intra-CC and inter-CC situations. In other words, the UE may report a first type of capability where multiple CSI reports are being requested for the same component carrier (intra-CC). The UE may report a different type of treatment for situations where two or more CSI report requests are issued for two or more different component carriers (inter-CC). More specifically, the UE may report its concurrent CSI processing capability indicating that the UE supports concurrent CSI reporting for the inter-CC case, and that the UE does not support concurrent CSI reporting for the intra-CC case.

This capability reporting in 532 takes into account that support of concurrent CSI reporting for the inter-CC case is more reasonable, since different component carriers may each have allocated independent baseband processing power for carrier aggregation (CA). This capability reporting in 532 also takes into account that support of concurrent CSI reporting for the intra-CC case is less reasonable, given that no separate independent baseband processing power may be allocated for a single component carrier, and hence attempting to support concurrent CSI reporting for the intra-CC case may result in complication of the UE design.

As shown at 534, in some embodiments, the UE may report that in the case where multiple CSI requests are issued for the same component carrier, the UE should not be configured with concurrently active CSI reporting with different codebook types (different CodebookType). In other words, at 534 the UE reports its capability information such that, in any slot in a cell (for any single component carrier), the UE is not to be configured with active CSI-RS ports or active CSI-RS resources corresponding to CSI reporting of different codebook types (per TS 38.331). Stated yet another way, the capability information in 534 directs the base station that, for multiple CSI requests for a single component carrier, the UE should not be configured to perform concurrent CSI reporting of different codebook types for the same carrier.

As shown at 536, in some embodiments, for capability reporting of concurrent CSI processing the UE may separately indicate or specify different concurrent CSI reporting capabilities for various component carrier scenarios, including: Concurrent-CSI Intra-CC, Concurrent-CSI Inter-CC Intra-Band, and Concurrent-CSI Inter-CC Inter-band.

As described above, the Concurrent-CSI Intra-CC case refers to a situation where two or more CSI requests are issued for the same component carrier.

The Concurrent-CSI Inter-CC Intra-Band case refers to a situation where two or more CSI requests are issued for different component carriers, and the different component carriers are in the same frequency band.

The Concurrent-CSI Inter-CC Inter-band case refers to a situation where two or more CSI requests are issued for different component carriers, and the different component carriers are in different frequency bands.

One example of concurrent CSI processing capability reporting may be to indicate that the UE supports use of different codebook types in concurrent CSI processing for the inter-CC inter-band case, but does not support use of different codebook types in the intra-CC and inter-CC intra-band cases. Here it is noted that the capability reporting can be per feature-set, per-band, per-band-combination, or per-band-per-band-combination.

As shown at 538, in some embodiments the UE reports only certain supported combinations of codebook types for concurrent CSI reporting. In other words, at 538 the UE reports certain combinations of codebook types as being supported for concurrent CSI reporting, where combinations of codebook types that are not reported as being supported are not supported. Thus this capability information instructs the base station to only configure the UE with the supported combinations of codebook types for concurrent CSI reporting, and hence the base station is instructed to not configure the UE with unsupported combinations of codebook types for concurrent CSI reporting.

As described above, there are currently six different types of codebooks for CSI reporting. This produces a large number of potential combinations of codebooks. Some potential combinations would not be practical. In order to reduce the complexity of the UE, in this embodiment the UE only reports the capability to support a smaller subset of the possible codebook combinations that would be the most likely.

In some embodiments, the UE provides capability information indicating that it can support the following combinations:

{Rel-15 Type I Single Panel, Rel-15 Type II}
{Rel-15 Type I Single Panel, Rel-16 Type II}

Each of these two combinations includes "Type I Single Panel", where Type 1 is a lower resolution CSI report. One benefit of Type I is that the UE can report a higher rank, up to 8 layers of MIMO operation. Type II is the typical configuration for multi user MIMO, and may involve the base station pairing a UE with another UE. Type II involves a higher resolution of CSI reporting, along with a lesser number of layers relative to Type I.

2) UE CSI-RS Processing Capability Reporting Enhancement

In some embodiments, the UE operation described herein may operate to provide improved reporting of CSI resource capabilities to the base station. This may assist the base station in providing better CSI processing requests to the UE, especially in the case of concurrent CSI requests. Various embodiments of improved reporting of CSI resource capability is described below with reference to FIG. 7.

Figure 7:
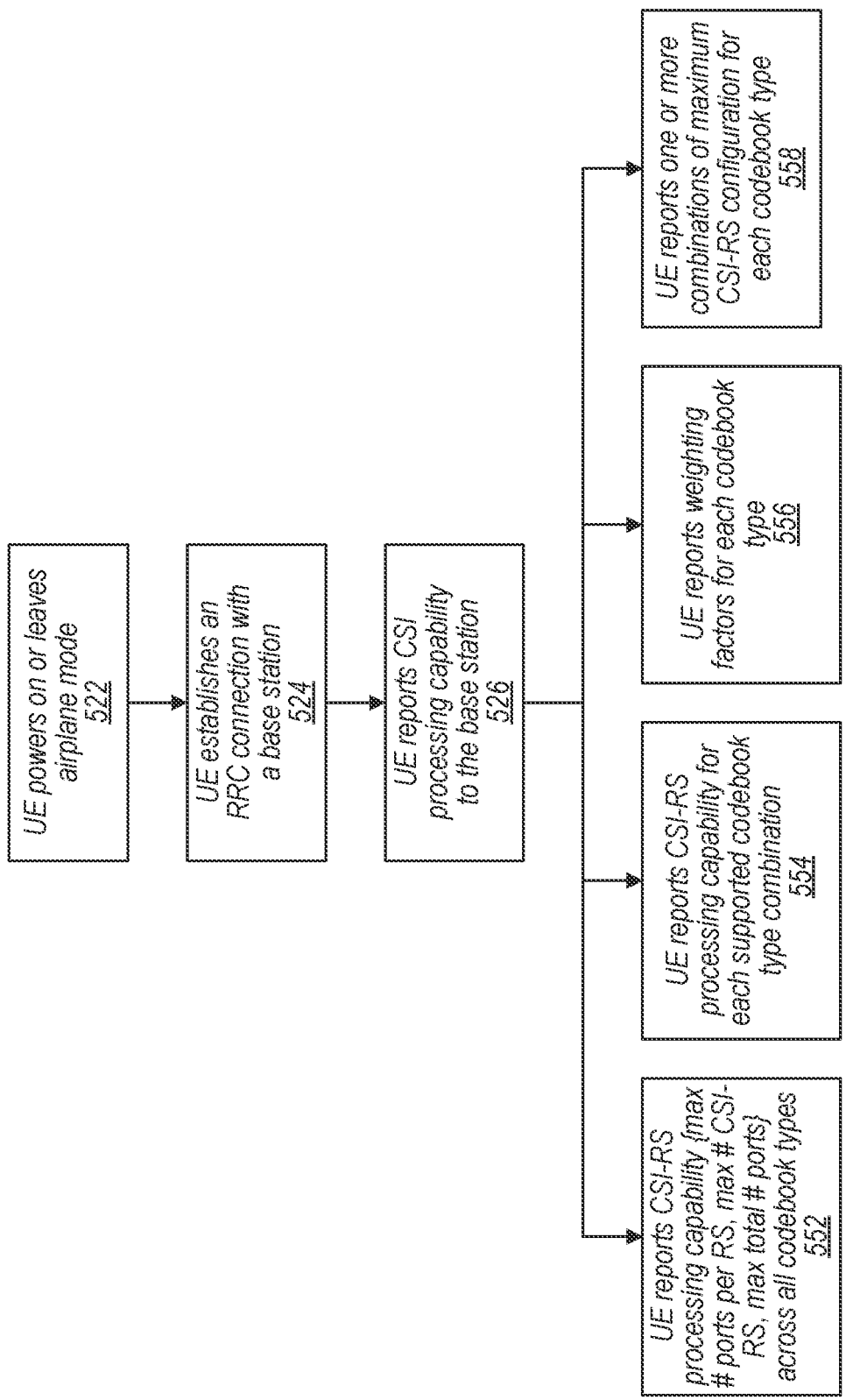
FIG. 7 is a flowchart diagram illustrating various additional embodiments of a UE reporting concurrent CSI processing capability to the base station.

FIG. 7 is a flowchart diagram illustrating an improved method for reporting CSI resource capabilities (CSI-RS processing capability) to the base station. As shown, the operation in FIG. 7 may proceed in a similar manner, where in 522 the UE receives power or exits airplane mode, in 524 the UE performs an RRC connection with a base station, and in 526 the reports CSI processing capability information.

In addition to reporting any standard CSI processing capability information in 526, in some embodiments the UE may also report capability information on CSI resources of the UE, as indicated in one or more of 552-558 of FIG. 7. The term CSI-RS refers to the reference signal sent by the base station and measured by the UE in generating channel state information. More specifically, the UE may measure the channel and the interference associated with the CSI reference signal and produce channel state information based on these measurements.

In 552-558 the UE provides enhanced information on CSI resources, or CSI-RS processing capability, which may include information related to the maximum number of ports per CSI-RS, the maximum number of CSI resources, and the maximum total number of CSI ports supported by the UE. One or more of steps 552-558 of FIG. 7 may be performed, and further one or more of 552-558 may be performed instead of, or in addition to, one or more of 532-538 of FIG. 6. Stated another way, any combination of steps 532-538 and 552-558 may be performed, e.g., any one, two, three or more combinations of any of these methods may be performed together.

As shown at 552, in addition to reporting the maximum number of ports per CSI-RS, the maximum number of CSI resources, and the maximum total number of CSI ports independently for each codebook type, the UE may additionally report the maximum number of ports per CSI-RS, the maximum number of CSI resources, and the maximum total number of CSI ports for all (or across all) codebook types. Thus in 552 the UE reports the total number of all of the CSI resources for all of the codebook types. In other words, the maximum number of CSI ports per CSI-RS, the maximum number of CSI resources, and the maximum total number of CSI ports may be each summed over all of the codebook types, and this information is provided to the base station. This report of the total number of CSI resources can be made separately for intra-CC and inter-CC scenarios.

From the perspective of the network, requests made to the UE should respect the maximum number of resources for each codebook type. In addition, the network can ensure that any/all CSI requests made to the UE use less than the total number of CSI resources for all codebook types as reported by the UE in 552. In other words, as long as the {max # ports per CSI-RS, max # CSI-RS, total # ports) across all activated concurrent CSI-RS processing is below the total UE reported capability (summed across all codebook types), then the UE will have the resources to support the multiple concurrent CSI requests.

It is noted that different codebook types utilize different amounts of CSI resources. For example, codebook Type I uses considerably less CSI resources (has considerably less computational complexity) than codebook Type II. The summation reporting performed in 552 would be most useful if all codebook types employed the same amount of computational complexity. Given that this is not the case, the UE may perform additional reporting as described below.

As shown at 554, the UE may also report the joint CSI-RS processing capability for each codebook type/UE combination that the UE can support. For example, the UE may make a report as follows:
{Rel-15 Type I Single Panel, Rel-15 Type II}: {max # ports/CSI-RS_1, max # CSI-RS_1, max total # ports_1)
{Rel-15 Type I Single Panel, Rel-16 Type II}: {max # ports/CSI-RS_2, max # CSI-RS_2, max total # ports_2)

Thus, as previously described at 538, where the UE reports only certain supported combinations of codebook types for concurrent CSI reporting, the UE may in addition report the max # ports/CSI-RS, max # CSI-RS, max total # ports) for each of these supported combinations. In the example given above, Rel-16 Type II entails a greater amount of computational resources than Rel-15 Type II. Thus the UE can report the differing amount of resources required for each combination.

As shown at 556, the UE may indicate weighting factors for each codebook type as part of its capability report. Calculation of these weighting factors may involve summing and weighting resource utilization of different codebook types as follows, where i is the codebook index:
$max_i\{W_i \times MaxPortPerCSIRS_i\}$
$sum_i\{W_i \times NumberOfCSIRS_i\}$
$sum_i\{W_i \times TotalNumberoOfPorts_i\}$ The weighting factors are a rough estimate of the relative complexity of each of the codebook types. These weighting factors can be used by the base station in determining the appropriate CSI requests made to the UE. As a simple example, assume the total number of CSI resources is 128, and that there are two codebook types, codebook type A and codebook type B. Further assume that the weighting factor for CSI resources in a type A codebook is 1, and the weighting factor for CSI resources in a type B codebook is set to 2, indicating that the type B codebook requires twice as many CSI resources as the type A codebook. In this case the base station would know that 128 CSI resources are available when using a type A codebook, and 64 CSI resources are available when using a type B codebook.

Alternatively, or in addition, at 556 as part of its capability reporting the UE may report several combinations of maximum CSI-RS configuration for each codebook type. For example, for {Rel-15 Type I Single Panel, Rel-16 Type II} the UE may report the following combinations of maximum CSI resources that could be used:
{16, 0, 0}, {16, 16, 128},
{16, 16, 256}, {16, 0, 0},
{16, 16, 64}, {16, 16, 96},
{16, 16, 32}, {16, 16, 80}, etc.

Each of these combinations comprises three values, where the first value represents the maximum number of ports per CSI-RS, the second value represents the maximum number of CSI resources, and the third value represents the maximum total number of ports. In the first example combination above, few or no resources are allocated for Rel-15 Type I Single Panel, and most of the resources are allocated for Rel-16 Type II. In the second example combination above, most resources are allocated for Rel-15 Type I Single Panel, and few resources are allocated for Rel-16 Type II. The final two combinations above have a more balanced allocation of resources between Rel-15 Type I Single Panel and Rel-16 Type II.

Figure 8:
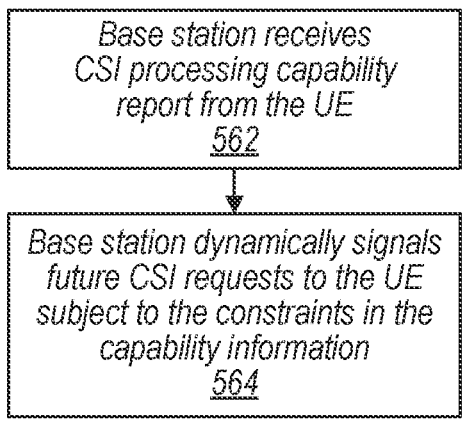
FIG. 8 is a flowchart diagram illustrating a method for a base station to receive and utilize CSI processing capability information received from the UE, according to some embodiments.

FIG. 8 is a flowchart diagram illustrating operation of the base station 102 in response to receiving CSI processing capability reports from the UE as described above in FIGS. 6 and 7.

As shown, at 562 the base station receives a CSI processing capability report from the UE. The CSI processing capability report received from the UE may comprise any of various sets or combinations of information described above in FIGS. 6 and 7. Thus the CSI processing capability report received from the UE may comprise any one or more of the sets of information generated in 532, 534, 536 and/or 538, and may also, or instead, comprise any one or more of the sets of information generated in 552, 554, 556, and/or 558.

At 564, the base station 102 operates to dynamically signal future CSI processing requests to the UE based on, or subject to, the constraints or information in the capability report received in 562. Thus the base station 102 may operate to constrain the manner in which it generates CSI processing requests to the UE based on the CSI capability received from the UE in 562.

Figure 9:
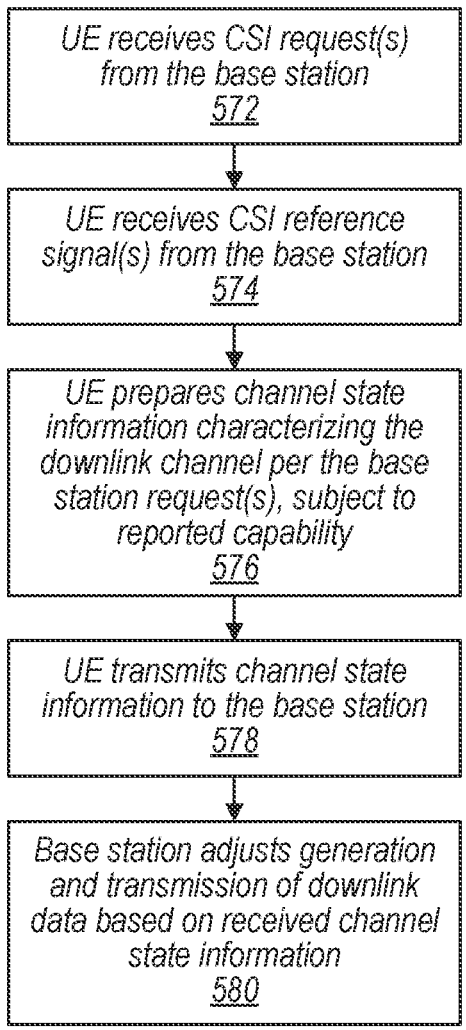
FIG. 9 is a flowchart diagram illustrating a method for a UE to receive and process a CSI request from the base station, according to some embodiments.

FIG. 9 is a flowchart diagram illustrating operation of the UE and the base station 102 in receiving and processing CSI requests.

As shown, at 572 the UE receives a CSI request from the base station 102. In some embodiments, at 572 the UE may receive a plurality of concurrent CSI requests from the base station 102. Particular operation of 572 is discussed further below.

At 574 the UE receives a CSI reference signal from the base station 102. The CSI reference signal may be received before or after receipt of the CSI request in 572. Where the CSI reference signal is received in 574 prior to receipt of the CSI processing request in 572, the CSI reference signal may be comprised in the same time slot as the CSI processing request. If the UE receives a plurality of concurrent CSI requests from the base station 102 in 572, the UE may also receive a corresponding plurality of CSI reference signals in 574.

At 576 the UE prepares channel state information (CSI) characterizing the downlink channel between the base station and the UE, per the CSI request received from the base station at 572. At 572 the UE may perform at least one channel measurement on the downlink channel and at least one interference measurement on the downlink channel. Where the UE has received multiple concurrent CSI processing requests in 572, the UE may perform measurements for each processing request and generate multiple instances of CSI reports in 576, e.g., may generate a CSI report for each of the received CSI requests. In some embodiments, as discussed further below, the UE perform a single set of measurements that is used in generating two or more CSI reports.

At 578 the UE transmits the channel state information report(s) to the base station 102.

At 580 the base station 102 receives the CSI report(s) from the UE and uses them to adjust its generation and transmission of downlink data. In other words, the base station 102 adjust the generation and transmission of downlink data to the UE based on the information received in the CSI reports.

3. Concurrent CSI Sharing the Same CMR/IMR RS

When the network desires to trigger the UE to perform a CSI report (e.g., as in 572 of FIG. 9), the base station may provide configuration information to the UE to configure an instance of CSI reporting. This is currently done using the field CSI-ReportConfig per TS 38.331. Here the base station configures the UE with the type of codebook desired for the UE to report as well as notifying the UE of the reference signal to be measured. When the base station desires to configure two different instances of CSI reporting concurrently, the base station is currently required to do separate and independent configurations to configure different channel measurement resources (CMR's) and interference measurement resources (IMR's) for each instance of CSI reporting. Thus, for example, the base station would currently configure a first set of CMR's and IMR's for Type 1 CSI reporting and a different second set of CMR's and IMR's for Type II CSI reporting. Also currently, the codebookConfig parameter is independently configured and only allowed to configure one codebook type.

However, in the case of concurrent CSI reporting, it is very likely that two instances of CSI reporting are measuring the same channel. Thus, the concurrent instances of CSI processing are not completely independent, even when they are being performed for different codebook types. For example, these different concurrent instances of CSI reporting may share a number of common processing components, such as one or more of channel estimation and interference estimation, which are generally common for all CSI reporting. The main difference between different concurrent instances of CSI reporting occur after the channel and interference measurements have been made, such as how the UE selects the precoder and reports it. Thus in current systems when concurrent CSI reporting is configured through overlapping (and redundant) configurations (two different CSI-ReportConfigs), the UE may be required to perform two or more different instances of channel and interference measurements, which may be unnecessary.

Therefore, the separate configuration of independent CMR's and IMR's for concurrent CSI processing can be a waste of resources. In other words, it has been determined that separate configuration of independent channel measurement and interference measurement resources for concurrent CSI processing is at least in some instances unnecessary. The unnecessary requirement of separate channel measurement and interference measurement resources for concurrent CSI processing is inefficient and complicates UE CSI processing.

In some embodiments, (at 572 of FIG. 9) the base station issues a CSI-ReportConfig where the base station configures the UE with one set of channel measurement and interference measurement resources for concurrent CSI processing, i.e., where the single CSI-ReportConfig operates to trigger multiple instances of CSI reporting. Thus this new CSI-ReportConfig message includes a list of multiple codebookConfig parameters, allowing the base station to configure multiple different codebook types for concurrent CSI reporting. This allows the UE to process a unified set of channel measurement and interference measurement resources (CMRs and IMRs) for multiple concurrent instances of CSI reporting. Thus, the base station can issue a single CSI configuration message (CSI-ReportConfig) to the UE which specifies one set of CMRs and IMRs, but may specify two or more codebook types and which triggers multiple instances of concurrent CSI reporting. The base station may also issue one CSI reference signal for UE measurement, instead of multiple CSI reference signals. This operates to reduce network signaling/overhead, UE processing complexity and the risk of an incorrect configuration being generated for one of the CSI reports.

The following shows an example of the parameter change "CodebookConfig CodebookConfig"→codebookConfig SEQUENCE (SIZE (1 . . . maxNrofConcurrentCodebook)) OF CodebookConfig Thus, instead of separate codebook configuration fields, the base station may generate a single codebook configuration field that contains a sequence of two or more codebooks to be used concurrently.

Figures 11A, 11B:
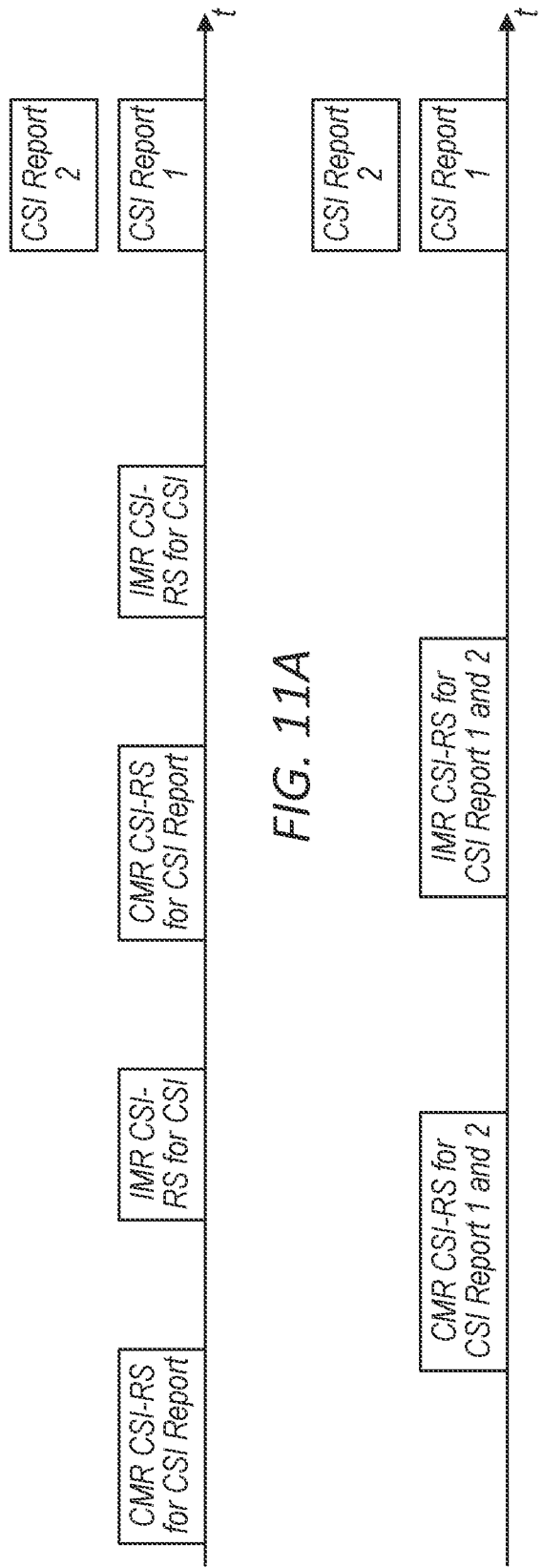
FIG. 11A illustrates configuration of multiple channel measurement and interference measurement resources for multiple CSI reports.
FIG. 11B illustrates UE configuration of a single channel measurement and interference measurement resource for multiple CSI reports, according to some embodiments.

The prior art operation is shown in FIG. 11A, where different channel and interference measurement resources (CMR and IMR) are configured for each instance of CSI reporting. As shown, a first instance of CMR and IMR resources are configured for a first CSI report (CSI Report 1) and a second instance of CMR and IMR resources are configured for a second CSI report (CSI Report 2).

Figure 10:
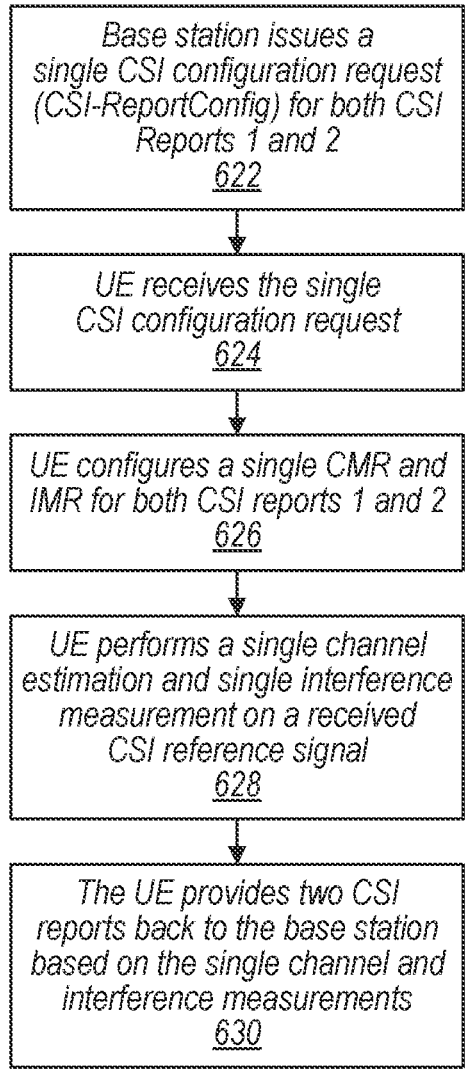
FIG. 10 is a flowchart diagram illustrating a method for a base station to issue a single CSI configuration command containing multiple CSI configuration requests according to some embodiments.

The flowchart of FIG. 10 illustrates operation according to embodiments described herein. The flowchart of 10 provides a more detailed example embodiment of the operations performed in FIG. 9. FIG. 11B is a timeline which also illustrates operation as described herein.

As shown in FIG. 10, at 622 the base station issues a single CSI configuration request (CSI-ReportConfig) for multiple CSI reports, e.g., CSI Reports 1 and 2. The single CSI configuration request may specify a single channel measurement resource (CMR) and a single interference measurement resource (IMR) for performing multiple CSI measurements for multiple CSI reports.

At 624 the UE receives the single CSI configuration request from the base station.

At 626, based on the received CSI configuration request specifying two (or more) CSI requests, the UE configures a single channel measurement resource (CMR) for multiple CSI reports, e.g., for both CSI reports 1 and 2, and similarly configures a single interference measurement resource (IMR) for multiple CSI reports, e.g., both CSI Reports 1 and 2 (as shown in FIG. 11B).

At 628 the UE may then perform a single channel estimation on a received CSI reference signal and may also perform a single interference measurement on the received CSI reference signal.

At 630 the UE provides two (or more) CSI reports back to the base station (as shown in FIG. 11B), where these two (or more) CSI reports are based on the single channel and interference measurements. Although the example was described above in the context of two CSI report requests, the above method can be used with any number of CSI report requests and subsequent CSI reports.

In other embodiments, when the network (base station) has not been configured as described above and still issues two (or more) CSI configuration commands (two or more instances of CSI-ReportConfig) specifying two or more different sets of CSI reporting the UE may be configured to use only one of the sets of channel and interference measurement resources for one of the codebook types in order to perform the requested concurrent CSI reporting. Thus even when the base station operates according to the prior art and issues multiple concurrent CSI requests, the UE may use this optimization, assuming the configuration of ports for the CMR and IMR are the same for each of the concurrent instances of CSI reporting.

Figure 12:
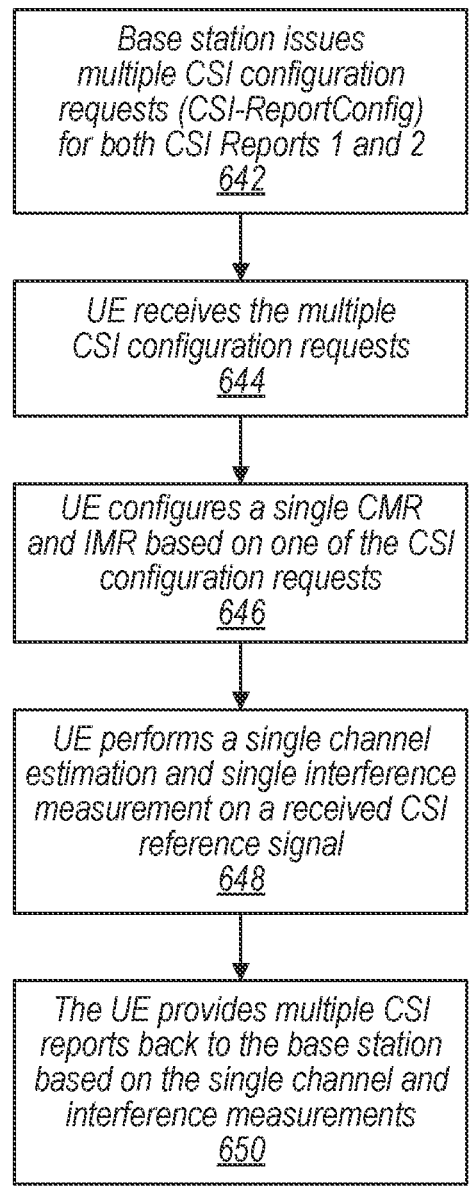
FIG. 12 is a flowchart diagram illustrating a method where a UE configures a single channel measurement and interference measurement resource for multiple received CSI configuration requests, according to some embodiments.

FIG. 12 illustrates this operation. As shown at 642 the base station issues multiple CSI configuration requests (multiple CSI-ReportConfig) for multiple CSI reports, e.g., CSI Reports 1 and 2.

At 642 the UE receives the multiple CSI configuration requests from the base station.

Figures 13A, 13B:
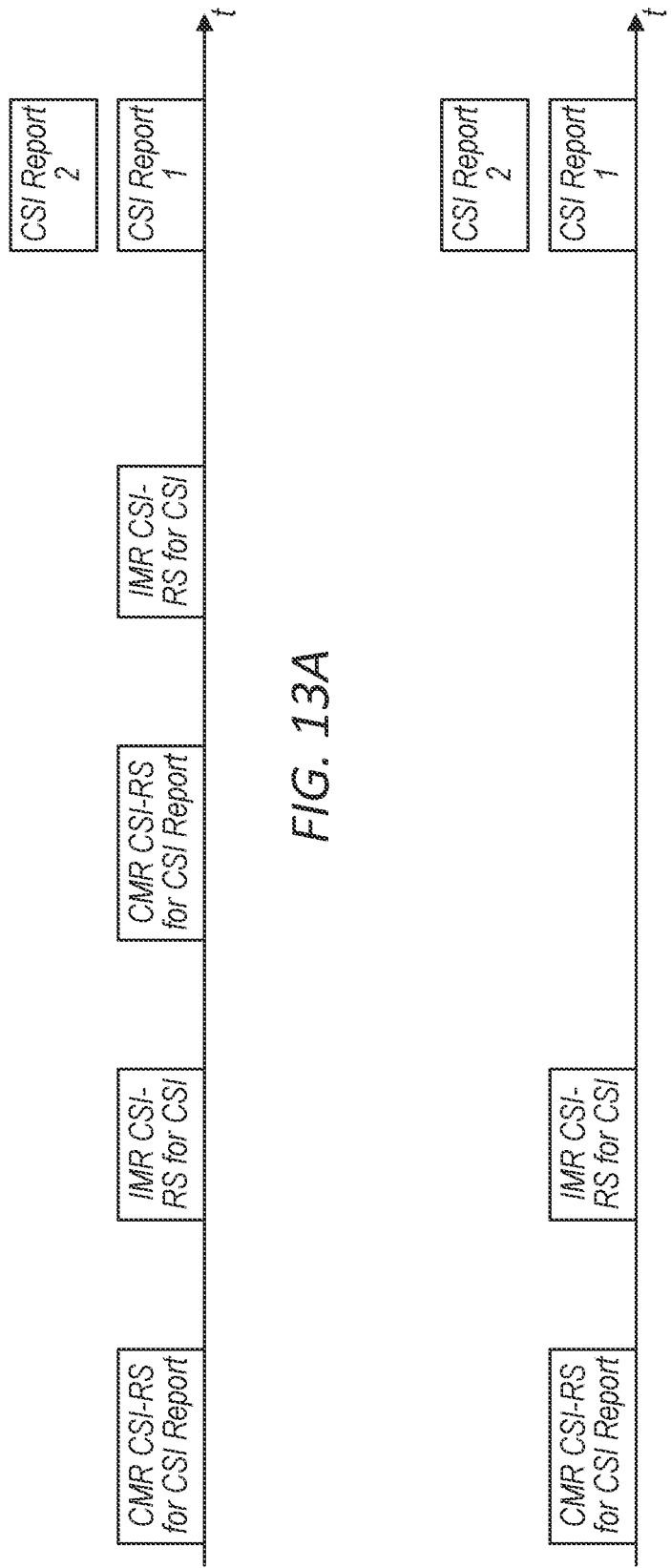
FIG. 13A illustrates configuration of multiple channel measurement and interference measurement resources for multiple CSI reports.
FIG. 13B illustrates UE configuration of a single channel measurement and interference measurement resource for multiple CSI requests, according to some embodiments.

At 646, based on the received multiple CSI configuration requests specifying two (or more) CSI reports, the UE configures a single channel measurement resource (CMR) for one of the CSI reports (e.g., CSI report 1), and similarly configures a single interference measurement resource (IMR) for this one CSI report (CSI report 1), as shown in FIG. 13B).

At 648 the UE may then perform a single channel estimation on a received CSI reference signal and may also perform a single interference measurement on the received CSI reference signal.

At 650 the UE provides multiple (e.g., two) CSI reports back to the base station (as shown in FIG. 11B), where these two CSI reports are based on the single channel and interference measurements for only one of the CSI requests. Although the example was described above in the context of two CSI report requests, the above method can be used with any number of CSI report requests and subsequent CSI reports.

4. Concurrent CSI Reporting Processing Time Relaxation

For aperiodic CSI requests, in the current art the UE minimum CSI processing timing is defined with the parameters Z and Z', as defined in TS 38.214. Embodiments described herein operate to re-define these processing time parameters—to lengthen or "relax" them to account for the fact that the UE may be performing multiple concurrent CSI requests, and hence may need more time to complete the various channel and interference measurements.

Figure 14:
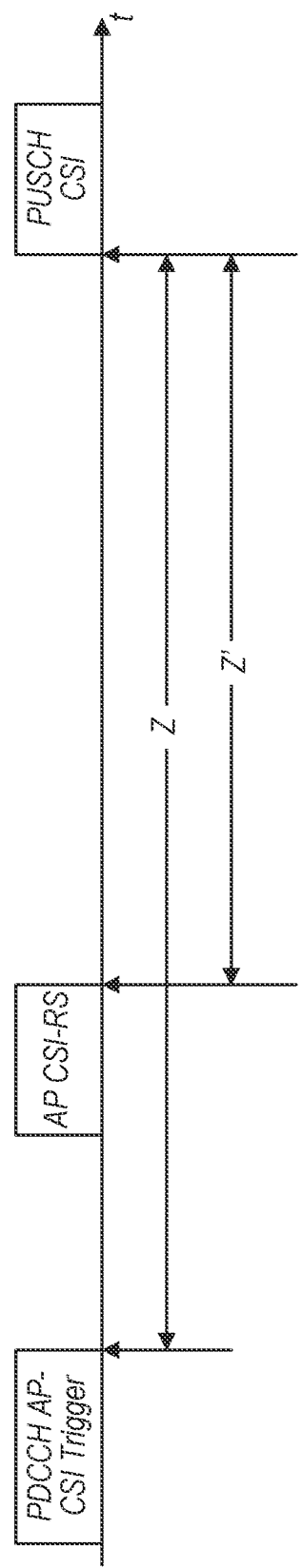
FIG. 14 illustrates Z and Z' minimum timing for CSI-RS processing, according to some embodiments.

As shown in FIG. 14, an aperiodic (AP) CSI request is received from the base station over the Physical Downlink Control Channel (PDCCH), as a PDCCH AP-CSI Trigger (as downlink control information or DCI). An aperiodic CSI reference signal (AP CSI-RS) is also transmitted by the base station to the UE. The aperiodic CSI reference signal is shown as being transmitted later than the AP CSI request, but it may be earlier in the same slot. After the AP CSI-RS is transmitted, the UE performs the measurements on the reference signal and then generates one or more CSI reports that are transmitted back to the base station on the Physical Uplink Shared Channel (PUSCH). This is shown by the "PUSCH CSI" in FIG. 14.

In some embodiments, the time value Z is defined to start from the last symbol of the last PDCCH among all of the PDCCH that trigger concurrent CSI-RS reporting. Stated another way, the time value Z is defined to start from the last symbol of the last set of downlink control information (DCI) associated with the last CSI request (in the last PDCCH containing a CSI request) Thus where the US receives multiple CSI report requests (for concurrent CSI reporting) over multiple downlink control channels (multiple PDCCH), the time value Z only begins from the last symbol of the last downlink control information in the last downlink control channel (last PDCCH) which contains a CSI report request.

In other words, the time value measurement Z only begins at completion of the last of the concurrent CSI report requests having been received.

The time value Z' starts from the last symbol of the last AP-CSI-RS among all AP-CSI-RS that are activated for concurrent CSI-RS reporting. Thus where the base station transmits multiple aperiodic reference signals (multiple AP CSI-RS) for concurrent CSI reporting, Z' only begins from the last symbol of the last received reference signal.

The time values Z and Z' represent the minimum amount of time allowed for the UE to perform the necessary channel measurements and generate and transmit a resultant CSI report. In the embodiments described herein, the Z and Z' values are re-defined to account for concurrent CSI reporting scenarios, thereby giving the UE more time to complete its operations in scenarios where the UE has been asked to generate multiple concurrent CSI reports.

In some embodiments, the Z and Z' values are "hard-coded" into the cellular specification, wherein the UE manufacturer and network vendor agree on minimum values for Z and Z' and implement these values into their equipment FIGS. 15A and 15B each illustrate a table which contains example values for Z and Z', these being relaxed time values to account for concurrent CSI reporting.

In one embodiment the UE CSI processing time is set to the maximum of the CSI reporting time within the concurrent CSI reporting that is being performed.

In another embodiment, the UE CSI processing time is set to the sum of Z and Z' corresponding to each CSI reporting instance in the concurrent CSI reporting that is being performed. This provides the most relaxed timing requirement, wherein the Z and Z' time values for all of the CSI reporting instances are summed. These summed Z and Z' values can account for a situation where the concurrent CSI reports are actually done serially (and not concurrently).

The relaxed time values Z and Z' may be used operationally as follows. First the base station configures and triggers one or more aperiodic CSI reports as described above. The UE receives these CSI requests in 572 of FIG. 9. The aperiodic CSI request (AP-CSI) may be triggered and configured in downlink control information (DCI) format 0_1. In the DCI, the base station, (e.g., gNB) may provide the configuration for the CSI reference signal (CSI-RS/SSB) that UE can use to measure the channel and interference. This includes both the frequency domain and time domain allocation, i.e. including when the CSI-RS/SSB will be transmitted from the gNB for the UE to measure. The term "SSB" refers to a combination of Synchronization Signals (SS) and Physical Broadcast Channel (PBC), which is referred to as "SSB" in NR.

In the DCI, the base station, (e.g., gNB) may also provide the configurations for PUSCH which carries the CSI content. This includes both the frequency and time domain allocation, e.g., including when the UE should start to transmit the CSI report on the uplink channel (PUSCH).

Thus, in the DCI the base station may configure the time offset between the downlink control information which contains the CSI request and the CSI reference signal (between the DCI and the CSI-RS/SSB), and the offset between the DCI which contains the CSI request and the transmission of the CSI report on the uplink channel PUSCH (between the DCI and the PUSCH). This enables the UE to know when to measure the CSI reference signal (CSI-RS/SSB), and also enables the UE to know when to transmit the resulting CSI report on the PUSCH. In order to not exceed UE capability, the former (the time period between the DCI and the CSI-RS/SSB) should be greater than or equal to Z and the latter (the time period between the DCI and the PUSCH) should be greater than or equal to Z'. As noted above, the minimum time value Z starts from the last symbol of the last PDCCH (last DCI) among all PDCCH (among all DCI) that triggers concurrent CSI-RS reporting. Also, the minimum time value Z' starts from the last symbol of the last AP-CSI-RS among all aperiodic CSI reference signals that are activated for concurrent CSI-RS reporting.

Therefore, in summary, in some embodiments, the UE may receive at least one channel state information (CSI) report configuration from the base station on a downlink channel, wherein the at least one CSI report configuration comprises information for configuring a plurality of concurrent CSI processing reports. The UE may also receive a plurality of CSI reference signals for concurrent CSI reporting. The at least one CSI report configuration may specify a first minimum time offset between a last symbol of a last downlink control information (DCI) containing a CSI report configuration and a CSI reference signal and a second minimum time offset between a last symbol of a last one of the CSI reference signals and an uplink channel. The UE may then perform at least one measurement on the each of the CSI reference signals to generate CSI and transmit the CSI in the uplink channel. The UE may perform the at least one measurement based on the first minimum time offset, and may transmit the CSI in the uplink channel based on the second minimum time offset.

5. Concurrent CSI Rank Restriction

Concurrent CSI reporting is most suitable for single user MIMO (SU-MIMO) and multi-user MIMO (MU-MIMO). For example, Type I CSI reporting has lower resolution but supports up to 8 ports suitable for SU-MIMO, and Type II CSI reporting has a higher resolution and supports up to 4 ports suitable for MU-MIMO.

In some embodiments, for concurrent CSI reporting, the UE restricts the rank information to certain specified values based on the type of CSI reporting. For example, the rank information (RI) reported by the UE during concurrent CSI reporting is restricted to a first set of values for Type I CSI reporting and a second set of values for Type II CSI reporting. As one example, the rank restriction (the specified RI values that may be reported by the UE), may be as follows:

Rank 1/2 for Type II CSI reporting
Rank 3/4 for Type I CSI reporting

In some embodiments, the RI reported by the UE for different concurrent CSI reporting does not overlap, as shown above. The rank restriction described herein is a "hard dropping rule", meaning that even if additional rank data can fit in the CSI payload, there is no point in transmitting this extra data because it is deemed redundant with data already being transmitted.

When the UE reports a high resolution for a layer and then a low resolution for the same layer, this may be a waste of uplink resources since the low resolution report for the same layer is redundant. Stated another way, it may not make sense to transmit Type I and Type II reports for the same two layers, since a Type II report is better (higher resolution) than Type I. Thus, for example, if there are two layers, and a Type II report is already being made, then there is no point in also transmitting a Type I report. The rank restriction described above operates to help reduce or eliminate this redundancy of reporting. Since Type II is currently limited to 4 layers or less, Type I may be useful for scenarios where there are greater than 4 layers, and thus Ranks 3 and 4 are reserved for Type I CSI reporting, while Ranks 1 and 2 are reserved for Type II CSI reporting.

In some embodiments, when concurrent CSI report information cannot fit into a CSI payload in PUCCH or PUSCH, some CSI can be dropped based on a predetermined priority rule. One example of a priority rule is:

Type I Single Panel/Multi Panel>Rel-16 Type II>Rel-16 Port Selection>Rel-15 Type II>Rel-15 Type II Port Selection Here the first element (Type I Single Panel/Multi Panel) has top priority, followed by the next element (Rel-16 Type II), and so on. Type I Single Panel has the lowest CSI overhead and at least carries the basic MIMO report, so in this example Type I has the highest priority (will be dropped last). Rel-16 Type 2 supports higher resolution and includes overhead compression, and thus has the next priority. The relative priority between Rel-16 Type II and Rel-16 Port Selection is less important. Rel-15 Type II has higher overhead and a lower number of layers and thus has a lower priority. It is noted that any of various priority orders may be used, as desired.

Thus where the UE is generating multiple CSI reports and lacks adequately payload capacity, the UE may prioritize certain CSI reports over others, and hence may selectively transmit higher priority reports and drop (not transmit) one or more lower priority reports.

The following numbered paragraphs describe additional embodiments:

1. A cellular base station, comprising: a plurality of antennas; a radio operably coupled to the plurality of antennas; and a processor operably coupled to the radio; wherein the cellular base station is configured to: establish a first radio resource control (RRC) connection with a user equipment (UE) of a cellular network; generate and transmit a single channel state information (CSI) report configuration to the UE, wherein the single CSI report configuration comprises information for configuring a plurality of concurrent CSI processing reports and further comprises a plurality of codebook configuration parameters specifying different codebook types, wherein the CSI report configuration is useable for configuring the UE with a plurality of concurrent CSI processing requests, wherein two or more of the plurality of concurrent CSI processing requests use the different codebook types.

2. A user equipment (UE), comprising: a plurality of antennas; a radio operably coupled to the plurality of antennas; and a processor operably coupled to the radio; wherein the UE is configured to: receive a channel state information (CSI) report configuration from the base station on a downlink channel, wherein the CSI report configuration comprises information for configuring a plurality of concurrent CSI processing reports, wherein the CSI report configuration comprises a plurality of codebook configuration parameters specifying different codebook types, wherein two or more of the plurality of concurrent CSI processing requests use the different codebook types; configure a first channel measurement resource and a first interference measurement resource on the UE to perform CSI measurements on the downlink channel; generate a plurality of CSI reports based on the first channel measurement resource and the first interference measurement resource resources; and transmit the plurality of CSI reports to the base station.

3. A user equipment (UE), comprising: a plurality of antennas; a radio operably coupled to the plurality of antennas; and a processor operably coupled to the radio; wherein the UE is configured to: receive at least one channel state information (CSI) report configuration from the base station on a downlink channel, wherein the at least one CSI report configuration comprises information for configuring a plurality of concurrent CSI processing reports; receive a plurality of CSI reference signals for concurrent CSI reporting; wherein the at least one CSI report configuration specifies a first minimum time offset between a last symbol of a last downlink control information (DCI) containing a CSI report configuration and a CSI reference signal and a second minimum time offset between a last symbol of a last one of the CSI reference signals and an uplink channel; perform at least one measurement on the each of the CSI reference signals to generate CSI; transmit the CSI in the uplink channel; wherein the UE performs the at least one measurement based on the first minimum time offset; wherein the UE transmits the CSI in the uplink channel based on the second minimum time offset.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. A method, comprising:
   establishing a first radio resource control (RRC) connection with a base station of a cellular network; and
   transmitting, to the base station, capability information related to combinations of codebook types, wherein the capability information includes capability for respective supported combinations of codebook types, and wherein the capability information for the respective supported combinations of codebook types includes a maximum number of ports per channel state information (CSI) resource, a maximum number of CSI resources, and a maximum number of total ports.

2. The method of claim 1, wherein the capability information is useable by the base station in formulating concurrent CSI processing requests.

3. The method of claim 1,
   wherein the capability information indicates support for concurrent CSI reporting when multiple concurrent instances of CSI processing are requested for two or more different component carriers; and
   wherein the capability information indicates lack of support for concurrent CSI reporting when multiple concurrent instances of CSI processing are requested for a single component carrier using multiple codebook types.

4. The method of claim 1,
wherein the capability information specifies separate concurrent CSI reporting capability for each of the following scenarios:
   1) multiple concurrent instances of CSI processing are requested for a single component carrier;
   2) multiple concurrent instances of CSI processing are requested for multiple component carriers, and the multiple component carriers are in a same operating frequency band; and
   3) multiple concurrent instances of CSI processing are requested for multiple component carriers, and the multiple component carriers are in different operating frequency bands.

5. The method of claim 1, wherein the combinations of codebook types are selected from a group including combinations:
   Rel-15 Type I Single Panel, Rel-15 Type II; and
   Rel-15 Type I Single Panel, Rel-16 Type II.

6. The method of claim 1,
   wherein the capability information separately specifies capabilities for two or more different component carriers and for a single component carrier using multiple codebook types.

7. The method of claim 1,
   wherein the capability information includes weighting factors for each of a plurality of codebook types, wherein the weighting factors are usable by the base station in assessing usage of CSI resources in CSI processing requests.

8. A non-transitory computer readable memory medium, comprising:
program instructions configured to cause a base station of a cellular network to:
   establish a first radio resource control (RRC) connection with a user equipment (UE); and
   receiving, for the UE, capability information related to combinations of codebook types, wherein the capability information includes capability for respective supported combinations of codebook types, and wherein the capability information for the respective supported combinations of codebook types includes a maximum number of ports per channel state information (CSI)

resource, a maximum number of CSI resources, and a maximum number of total ports.

9. The non-transitory computer readable memory medium of claim 8, wherein the capability information is useable by the base station in formulating concurrent CSI processing requests.

10. The non-transitory computer readable memory medium of claim 8,
wherein the capability information indicates support for concurrent CSI reporting when multiple concurrent instances of CSI processing are requested for two or more different component carriers; and
wherein the capability information indicates lack of support for concurrent CSI reporting when multiple concurrent instances of CSI processing are requested for a single component carrier using multiple codebook types.

11. The non-transitory computer readable memory medium of claim 8, wherein the capability information specifies separate concurrent CSI reporting capability for each of the following scenarios:
1) multiple concurrent instances of CSI processing are requested for a single component carrier;
2) multiple concurrent instances of CSI processing are requested for multiple component carriers, and the multiple component carriers are in a same operating frequency band; and
3) multiple concurrent instances of CSI processing are requested for multiple component carriers, and the multiple component carriers are in different operating frequency bands.

12. The non-transitory computer readable memory medium of claim 8, wherein the combinations of codebook types are selected from a group including combinations:
Rel-15 Type I Single Panel, Rel-15 Type II; and
Rel-15 Type I Single Panel, Rel-16 Type II.

13. The non-transitory computer readable memory medium of claim 8,
wherein the capability information separately specifies capabilities for two or more different component carriers and for a single component carrier using multiple codebook types.

14. The non-transitory computer readable memory medium of claim 8,
wherein the capability information includes weighting factors for each of a plurality of codebook types, wherein the weighting factors are usable by the base station in assessing usage of CSI resources in CSI processing requests.

15. An apparatus, comprising:
a processor configured to cause a base station of a cellular network to:
establish a first radio resource control (RRC) connection with a user equipment (UE); and
receive, from the UE, channel state information (CSI) capability information, wherein the CSI capability information comprises information on concurrent CSI processing capability of the UE, wherein the CSI capability information includes capability for each supported combination of codebook types, and wherein the capability information for each supported combination of codebook types includes a maximum number of ports per CSI resource, a maximum number of CSI resources, and a maximum number of total ports.

16. The apparatus of claim 15,
wherein the CSI capability information is useable by the base station in formulating concurrent CSI processing requests to the UE.

17. The apparatus of claim 15,
wherein the CSI capability information indicates that the UE supports concurrent CSI reporting when multiple concurrent instances of CSI processing are requested for two or more different component carriers; and
wherein the CSI capability information indicates that the UE does not support concurrent CSI reporting when multiple concurrent instances of CSI processing are requested for a single component carrier using multiple codebook types.

18. The apparatus of claim 15,
wherein the CSI capability information specifies separate concurrent CSI reporting capability for each of the following scenarios:
1) multiple concurrent instances of CSI processing are requested for a single component carrier;
2) multiple concurrent instances of CSI processing are requested for multiple component carriers, and the multiple component carriers are in a same operating frequency band; and
3) multiple concurrent instances of CSI processing are requested for multiple component carriers, and the multiple component carriers are in different operating frequency bands.

19. The apparatus of claim 15, wherein the CSI capability information separately specifies capabilities for concurrent CSI per band and per band combination.

20. The apparatus of claim 15,
wherein the CSI capability information separately specifies capabilities for two or more different component carriers and for a single component carrier using multiple codebook types.

* * * * *